Nov. 27, 1934.  H. E. PETERSON  1,982,142
GRAPE STRIPPER
Filed Nov. 1, 1932   2 Sheets-Sheet 1

Henry E. Peterson
INVENTOR

BY
Charles L. Reynolds
ATTORNEY

Nov. 27, 1934.　　　H. E. PETERSON　　　1,982,142
GRAPE STRIPPER
Filed Nov. 1, 1932　　　2 Sheets-Sheet 2
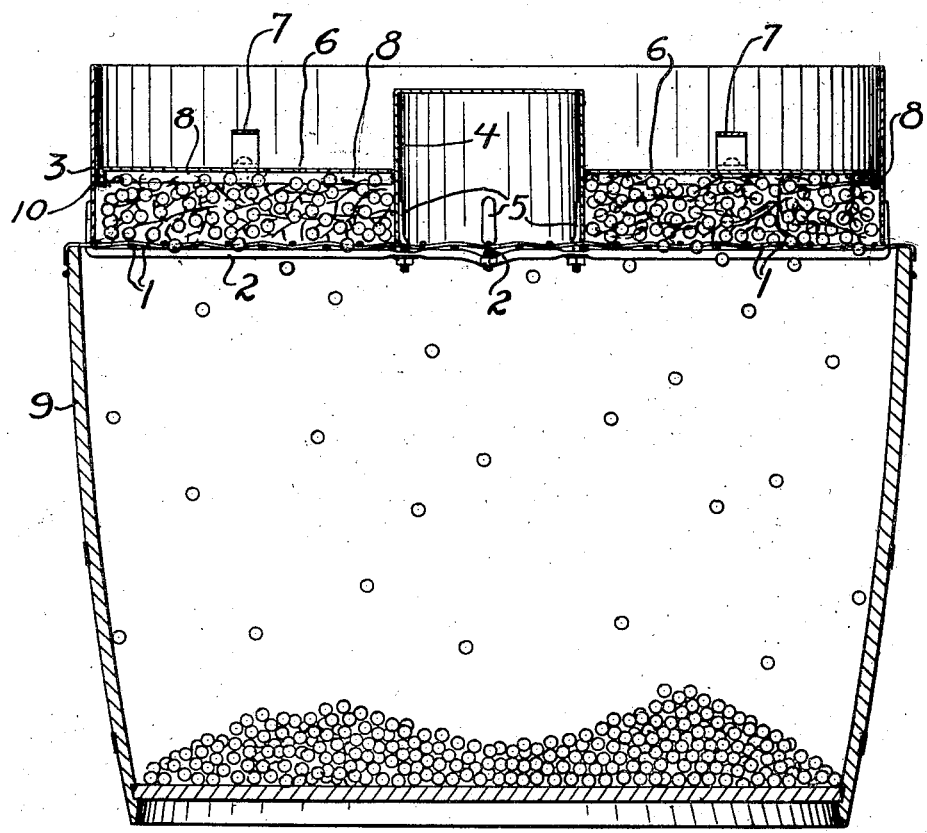
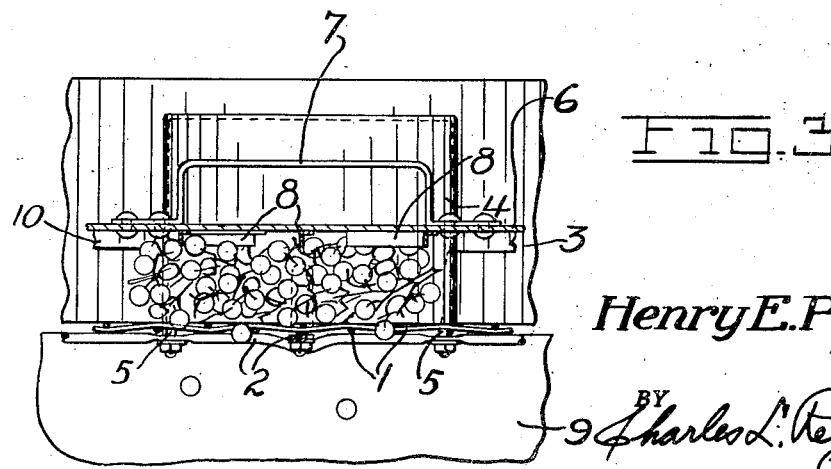
Henry E. Peterson
INVENTOR
BY Charles L. Reynolds
ATTORNEY Patented Nov. 27, 1934

1,982,142

UNITED STATES PATENT OFFICE 1,982,142

GRAPE STRIPPER

Henry E. Peterson, Grapeview, Wash.

Application November 1, 1932, Serial No. 640,611

7 Claims. (Cl. 146—55)

My invention relates to a device for mechanically stripping grapes from their stems as a preliminary operation to the manufacture of grape juice, for example.

It is desirable in the manufacture of grape juice to remove the grapes from the stems before they are placed in a grape press, for if the stems remain they will contribute a slightly bitter taste to the resultant juice. Hand stripping has been found to be impracticable because of its slowness.

The object of my invention is to provide a simple and inexpensive stripping machine which is considerably faster than the hand stripping method, but which will leave the grapes for the most part whole and in good condition, with only a negligible amount of mutilation of the individual grapes.

In general my invention comprises the novel combination and arrangement of parts, as shown in the accompanying drawings, described in the specification, and as defined in the appended claims.

Figure 2 is a sectional elevation of my device on the line 2—2 of Figure 1.

Figure 3 is a sectional elevation of a portion of my device through one side, showing in particular the central construction thereof.

Figure 1:
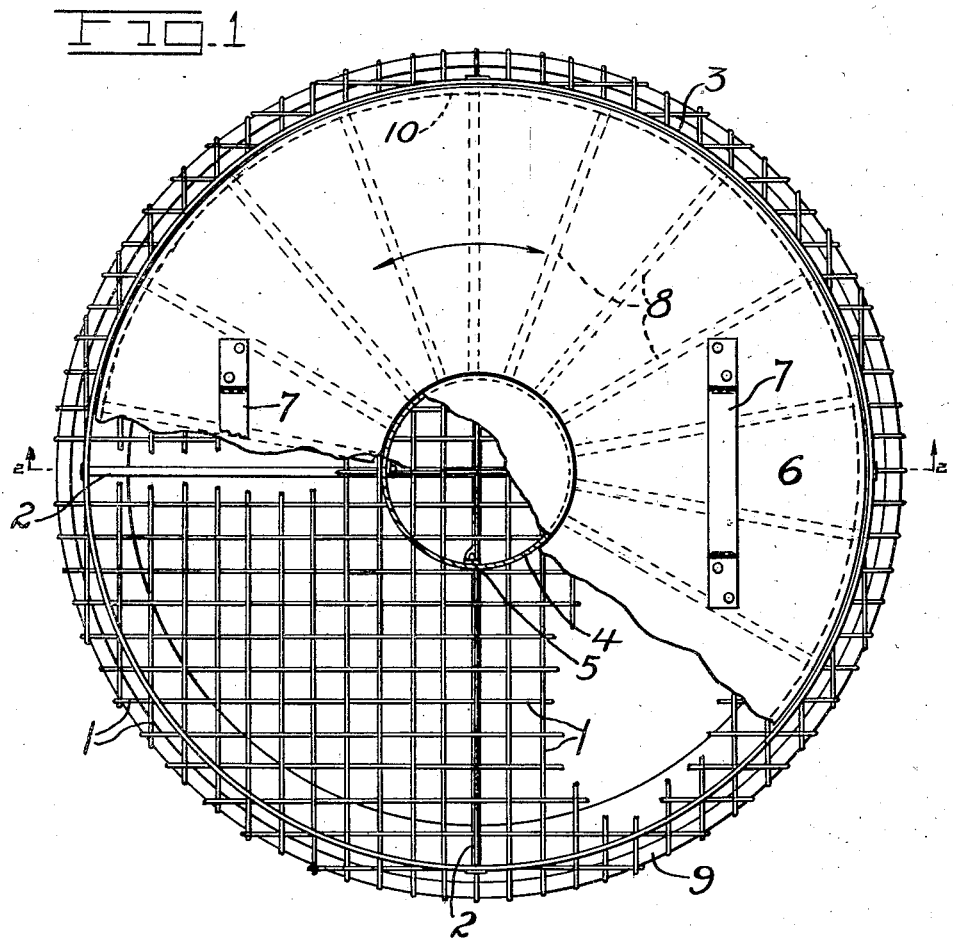
Figure 1 shows a plan view of the preferred form of my invention, parts of which have been broken away.

In the embodiment shown my invention consists of a container having a reticulated bottom 1 of wire screen of a proper mesh to permit the passage of whole grapes, but to prevent the passage of unstripped grapes and stems therethrough. A one-inch mesh has been found to operate satisfactorily for this purpose. Such a screen could, of course, be replaced by a plate apertured at intervals to allow the passage of grapes, but the woven wire screen is preferable, since its rough or uneven upper surface engages and holds the grapes better than the smooth surface of a plate. Cross braces 2 serve to stiffen the screen, and also act as supports for a circular marginal wall or ring 3. Centrally located within this ring and concentrically placed relative thereto is a dome 4 closed in at the top and supported by brackets 5, which dome may be the same height as the marginal ring, or lower if preferred. The space between the marginal ring and the central dome serves as a container for the unstripped grapes.

A plate 6 having handles 7 secured to its upper surface and radial ribs 8 formed on its lower surface is shaped to fit snugly between the dome and the marginal ring and to rest upon the unstripped grapes. This plate may be raised or lowered at will within the container but will always be in close proximity to the parallel walls of the ring 3 and the dome 4. In the drawings I have shown the screen 1 as having its edge downwardly flanged so that the device may be placed upon a receptacle such as the half barrel 9 illustrated, though any other form of receptacle or support may be used without departing from the spirit of my invention, and any suitable means for positioning the container thereon may be used. If desired, the braces 2 may be extended outward and bent down to engage about the rim of the container, and the screen 1 may be upwardly flanged to receive the wall 3, instead of the arrangement illustrated in the drawings.

The operation of my grape stripper will now be apparent. The unstripped grapes are placed in the container in the space between the dome 4 and the wall 3. The plate 6 is then placed on top of the grapes and oscillated to and fro by the operator grasping the handles 7. The radial ribs 8 engage the grapes and upon relative movement strip them from the stems, whereupon they gradually work down through the screen 1 and fall through into the container 9.

Figure 3 shows how the dome 4 serves to prevent the grapes from bunching up in the central portion of the container where there would be only slight movement of the plate if it extended across this portion. This eliminates any stagnation of the operation and the possibility of mutilating the grapes by allowing them to pile up in a single section rather than being distributed over the bottom of the container in a uniform layer. In a short time all the grapes will have been stripped from their stems and will have fallen through the screen 1, leaving only a matted network of stems in the container, which may be easily removed, and the container again filled with unstripped grapes in preparation for a second operation. A marginal flange 10, depending from the plate 6 to a level slightly below the ribs 8, engages the mesh bottom when all the grapes have been stripped, and thus protects the ribs and the mesh bottom beneath them from injury, such as might result were the ribs themselves to come into contact with the screen.

While in the form of my invention shown the stripping members appear as ribs 8, they may take any other form desired such as fingers, or even a mere roughening of the under side of the plate 6. The screen base 1 provides a convenient method of permitting the grapes to pass from the container into the receptacle 9, but any other form of apertures in the lower portion of the container may be used as desired. Similarly any suitable means to effect a distribution of the grapes over the container bottom may replace the dome 4 illustrated. Other modifications might also be made within the scope of the appended claims.

What I claim as my invention is:

1. A grape stripper for use with a receptacle, comprising a container for holding unstripped grapes and adapted to be positioned above the receptacle, said container having a reticulated bottom and a marginal wall upstanding therefrom, and a plate supported on the unstripped grapes and otherwise unrestrained from vertical movement, and having means on its under surface to engage the grapes, and upon relative lateral movement to pull them from their stems.

2. A grape stripper comprising a container having a reticulated bottom permitting passage of whole grapes, a cover plate received within the upper end of the container, and guided thereby for lateral movement, but being unrestrained against vertical movement, said plate having a roughened under surface to engage and pull the grapes from the stems, and means to shift the cover plate relative to the bottom, thereby to engage the roughened under surface with the grapes.

3. A grape stripper for use with a receptacle comprising a container adapted to be positioned above the receptacle, and having apertures in its lower portion of a size to allow the passage of stripped grapes but to prevent the passage of unstripped grapes and stems, and a plate supported solely on the unstripped grapes and having grape-engaging ribs on its under surface, adapted upon oscillation of said plate to engage and pull the grapes from the stems.

4. A grape stripper for use with a receptacle comprising a container adapted to be positioned above the receptacle, and having apertures in its lower portion of a size to allow the passage of stripped grapes but to prevent the passage of unstripped grapes and stems, a plate adapted to rest on and to be supported by the unstripped grapes and having grape-engaging ribs on its under surface, adapted upon oscillation of said plate to engage and pull the grapes from the stems, and a marginal flange having a continuous lower edge depending from the plate to a level below that of the ribs, whereby contact of the ribs with the apertured lower portion of the container is prevented.

5. A grape stripper comprising a container having a reticulated bottom permitting the passage of whole grapes, and a plate fitting snugly within the upper end of the container, the container having parallel opposite walls to permit said plate to move downward to the bottom of the container, while remaining at all times in close proximity to such parallel walls.

6. A grape stripper comprising a circular container having apertures in its lower portion of a size larger than a grape, means to restrain the grapes from the central portion of the container, and a cover fitting snugly within said container and adapted to engage unstripped grapes reposing therein, said cover and said container being relatively rotatable, such relative rotation operating to pull and separate the grapes from the stems whereby they may fall through the apertures in the container.

7. A grape stripper for use with a receptacle comprising a braced wire screen adapted to seat on the receptacle of mesh larger than a grape, but small enough to prevent the passage of unstripped grapes and stems, a circular collar supported on said screen within which unstripped grapes may be placed, a central dome supported on said screen of substantially not greater than the height of the collar, and a plate adapted to rest on the unstripped grapes and received between said collar and said dome, having handles on its upper side for oscillation and radially disposed ribs on its under side, thus by engagement of said ribs with the grapes to strip them from the stems as the plate is oscillated so that they may drop through the screen into the container below.

HENRY E. PETERSON.